United States Patent [19]
Bauer et al.

[11] Patent Number: 5,273,259
[45] Date of Patent: Dec. 28, 1993

[54] LONGITUDINALLY ADJUSTABLE GAS SPRING

[75] Inventors: Hans J. Bauer; Hans-Peter Bauer, both of Altdorf; Jochen Meyer; Jürgen Späthe, both of Creussen; Herbert Wolf, Nürnberg, all of Fed. Rep. of Germany

[73] Assignee: SUSPA Compart Aktiengesellschaft, Altdorf, Fed. Rep. of Germany

[21] Appl. No.: 672,495

[22] Filed: Mar. 20, 1991

[30] Foreign Application Priority Data

Mar. 21, 1990 [DE] Fed. Rep. of Germany ....... 4009034

[51] Int. Cl.$^5$ ............................................... F16F 5/00
[52] U.S. Cl. ................................................. 267/64.12
[58] Field of Search .................. 267/64.12; 188/299, 188/300, 322.19, 274; 248/631, 169; 297/355

[56] References Cited

U.S. PATENT DOCUMENTS

| | | | |
|---|---|---|---|
| 3,393,883 | 7/1968 | Smith et al. | 267/64.12 X |
| 4,667,780 | 5/1987 | Pauliukonis | 188/322.21 X |
| 4,738,339 | 4/1988 | Taylor | 188/322.19 |
| 4,779,851 | 10/1988 | Bauer et al. | 188/300 X |
| 4,824,081 | 4/1989 | Pauliukonis | 188/300 X |

FOREIGN PATENT DOCUMENTS

| | | |
|---|---|---|
| 229089 | 8/1963 | Austria . |
| 1923239 | 5/1965 | Fed. Rep. of Germany . |
| 1201619 | 8/1965 | Fed. Rep. of Germany . |
| 7716983 | 5/1977 | Fed. Rep. of Germany . |
| 1812282 | 7/1981 | Fed. Rep. of Germany . |
| 3102276 | 1/1982 | Fed. Rep. of Germany . |
| 8630918 | 12/1987 | Fed. Rep. of Germany . |
| 684212 | 5/1965 | Italy ................................. 188/274 |
| 2197708 | 5/1988 | United Kingdom ................ 188/300 |

*Primary Examiner*—Robert J. Oberleitner
*Attorney, Agent, or Firm*—Browdy and Neimark

[57] ABSTRACT

In the case of a longitudinally adjustable gas spring with two tubes enclosing each other concentrically and with a valve at one end and with a relief channel at the end where the piston rod exits the inner tube consists of plastics material. It has groove-like channels on its external wall which connect the relief channel with the valve. The webs between adjacent channels bear against the internal wall of the outer tube. The result is a cost-saving structure of the inner tube, which at the same time becomes very stable and is easy to manufacture.

9 Claims, 1 Drawing Sheet

LONGITUDINALLY ADJUSTABLE GAS SPRING

FIELD OF THE INVENTION

The invention relates to a longitudinally adjustable gas spring comprising two tubes at least partially filled with a compressed gas, which enclose one another concentrically and define between them a relief chamber, a piston slidably arranged in the inner tube and bearing against its internal wall with a seal and dividing the inner chamber of the inner tube into two partial housing chambers, which piston is connected with a piston rod guided in a sealed manner outwards towards one tube end, at least one relief channel connecting the relief chamber and the associated partial housing chamber in the vicinity of where the piston rod exits, a valve closing the tubes outwards at the opposite end and connecting the relief chamber with the other partial housing chamber, the valve having a valve body against which the inner tube bears axially and radially.

BACKGROUND OF THE INVENTION

Gas springs of this kind are for example known from U.S. Pat. No. 3,656,593 and quite a number of subsequent publications of numerous variants. Because of their advantageous properties in particular as longitudinally adjustable lifting devices in chair columns and the like these gas springs have been extremely successful in practice. A small annular space is formed between the inner tube and the outer tube and serves as a relief space. The inner tube and the outer tube consist of steel, i.e. in particular of seamless drawn tubes, the internal wall of the inner tube still requiring a special surface treatment to achieve an impeccable sliding surface for the piston and for the seal located in the latter.

A longitudinally adjustable gas spring is known from DE No. 31 02 276 A1 having an outer tube and an inner hollow part located in the latter. A piston is slidably arranged in the hollow part and, sealed by a seal, bears against the internal wall of the hollow part; a piston rod is arranged on the piston and exits in a sealed manner at one end. A valve is provided at the other end. Two grooves are provided on the external wall of the hollow part, in which grooves tubes are arranged, which are introduced in a sealed manner into the valve and into the inner chamber of the hollow part adjacent to where the piston rod exits. This provides a construction wherein the gas spring substantially consists of one single body, namely the inner hollow part, with which the valve and the end on the side where the piston rod exits are integrally formed. In this case the outer tube only serves as means to provide a connection with the chair, table or the like to be supported. As compared with this the invention proceeds from that the whole gas spring is substantially defined, supported and axially held together by the outer tube — as is usual with the longitudinally adjustable gas springs of the generic kind.

SUMMARY OF THE INVENTION

It is an object of the invention to reduce the expenditure of material and machining of the gas spring in the field of its inner tube.

This object is achieved in accordance with the invention, if the inner tube consists of a plastics material, in the external wall of which several groove-like channels are provided forming the free space. Since the inner tube consists of plastics material, it can be made in one manufacturing operation and needs no subsequent treatment. Practially any high-quality plastics material has a polished hard surface no longer requiring a treatment whatsoever of the internal wall of the inner tube. The numerous little channels spread over the circumference of the external wall of the inner tube form a sufficiently large relief cross-section. These channels, too, can be made during the manufacturing operation of the inner tube.

When the inner tube radially bears against the internal wall of the outer tube by way of webs located between adjacent channels, it results that the inner tube of plastics material can be provided to have thin walls, since, bearing against the outer tube, it is stable in form, and cannot be pressed radially outwards upon deflection of the piston rod and thus of the piston. This helps to create a kind of composite part of outer tube and inner tube. Particularly the internal edge of the outer tube covers the individual channels. This cover need not be such that neighbouring channels are separated from each other in a gas-tight manner. Rather, it is to be ensured that the webs remaining between adjacent channels, i.e. areas of the external wall of the inner tube, bear against the internal wall of the outer tube to a sufficient extent.

The wall thickness of the inner tube may be in a range identical to when the inner tubes are made of steel.

Furthermore the individual channels are only of extraordinarily little depth. A sufficient total of cross-section for the passage of the gas is due to the great number of channels.

Advantageously, in relation to the wall thickness, the individual channels only have a comparatively small width, so that here, too, it is ensured that no external wall areas too large in size are created on the inner tube, in which areas the inner tube cannot bear against the internal wall of the outer tube. In this context it should be clarified that the webs remaining between adjacent channels are sufficiently wide and ensure a sufficient support against the internal wall of the tube.

The construction of the channels can on the whole be made in such a way that, in the vicinity of its external wall, the inner tube is provided with a knurling extending parallel to the central longitudinal axis.

BRIEF DESCRIPTION OF THE DRAWING

Further advantages, features and details of the invention will become apparent from the ensuing description of an example of embodiment taken in conjunction with the drawing.

DESCRIPTION OF THE PREFERRED EMBODIMENT

Figure 1:
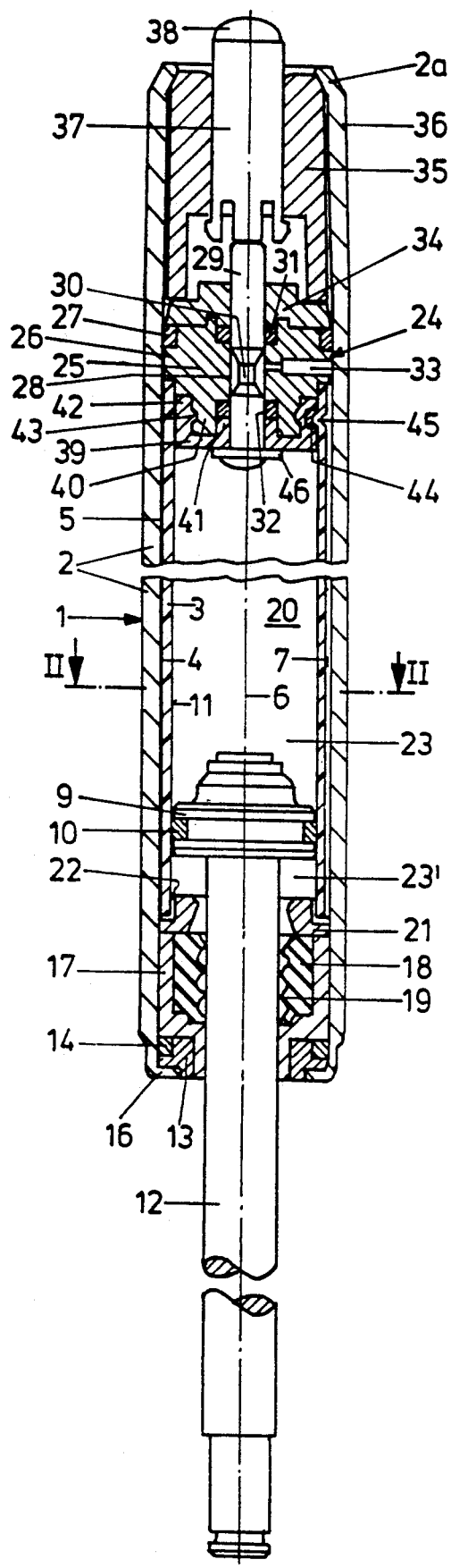
FIG. 1 is a longitudinal section through a gas spring according to the invention.
Figure 2:
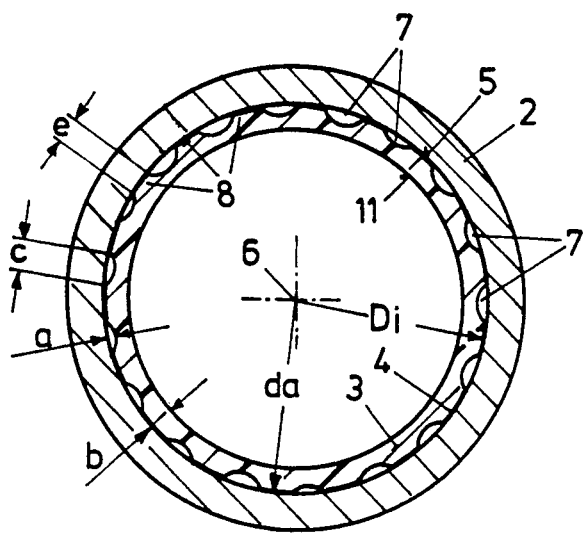
FIG. 2 is a cross-section through the gas spring according to section line II—II in FIG. 1.

The longitudinally adjustable gas spring shown in FIG. 1 has a housing 1 with two tubes of different diameter arranged concentrically one within the other, namely an outer tube 2 and an inner tube 3. Both tubes 2, 3 are cylindrical in shape in the area over which extends the inner tube 3. With its external wall 4 the inner tube 3 bears against the internal wall 5 of the outer tube 2, i.e. the outside diameter da of the inner tube 3 substantially corresponds to the inside diameter Di of the outer tube 2. On its external wall 4 the inner tube 3 has groove-like channels 7, which extend parallel to the common central longitudinal axis 6 of the housing 1, which are open towards the internal wall 5 of the outer tube 2, and which are thus defined towards the outside by this internal wall 5. A plurality of such channels 7 is arranged one parallel to the other extending along coatlines of the cylindrical inner tube 3. As can be seen from FIG. 2, $0.15 b < a < 0.25 b$ applies to the radial depth a of the channels 7, i.e. their depth in the direction towards the axis 6 is 15-25%, in relation to the wall thickness b of the inner tube 3. As regards the width c of the channels 7 in circumferential direction of the tube 3 $0.5 b < c < 0.8 b$ applies in relation to the wall thickness b, i.e. the width of the channels is 50 to 80% of the wall thickness b. Finally, regarding the distance e between adjacent channels in relation to their width c, $0.8 c < e$ applies, i.e. such distance e is greater than 80% of the width of the channels. The width c of the channels 7 is always defined in the external wall 4 of the inner tube 3. As regards the wall thickness b of the inner tube 3 in comparison to its outside diameter da, $0.05 da < b < 0.1 da$ is valid.

While the outer tube 2 consists of steel, the inner tube 3 consists of plastics material. It need not be arranged tightly in the outer tube 2 so that adjacent channels 7 are sealed off from one another; however, it can be guided in the outer tube 2 in such a manner that it is radially supported all around in the latter, the webs 8 between adjacent channels 7 bearing against the internal wall 5 of the outer tube 2.

The groove-like channels 7 altogether form a gas relief chamber.

An approximately annular piston 9 is axially displaceably arranged in the inner tube 3 and is sealed in gas-tight manner with its outside circumference towards the internal wall 11 of the inner tube 3 by way of a sealing ring 10. The piston 9 is secured to one end of a piston rod 12 guided coaxially in relation to the axis 6. This piston rod 12 comes out of one end of the housing 1. At this end the housing 1 is closed by a closing ring 13, which, at its outside circumference, is sealed off towards the internal wall 5 of the outer tube 2 by means of an annular seal 14. The closing ring 13 is held axially outwards by means of a flanging 16 of the outer tube 2. On the inside a cup-shaped sleeve 17 bears against the closing ring 13, which sleeve 17 receives a multiple-lip-type seal 18 resting with its sealing lips 19 in a sealing manner against the piston rod 12. Thus any gas exit to the outside is prevented along the surface of the piston rod 12.

From the inner chamber 20 of the housing 1 a spacing sleeve 21 is supported on the sleeve 17 and bears against the internal wall 5 of the outer tube 2 in a centered manner; the inner tube 3 is pushed onto this spacing sleeve 21. One relief channel 22 or several relief channels 22 are provided between this spacing sleeve 21 and the inner tube 3 and connect the channels 7 — namely all channels 7 — with the partial housing chamber 23 defined between the piston 9 and the seal 18 in the inner tube 3. The spacing sleeve 21 does not only bear axially against the sleeve 17, but also against the seal 18, so that the latter is held in the sleeve 17 in its position in the direction of the axis 6 shown in the drawing.

At the end of the housing opposite to where the piston rod exits a valve 24 is arranged, by means of which the partial housing chamber 23' located in the inner tube 3 between the piston 9 and the valve 24 is connected via the channels 7 with the other partial housing chamber 23 or separated from the latter.

The valve 24 has a valve body 25, which has a cylindrical section 26 bearing against the internal wall 5 of the outer tube 2. A seal 27 sealing off towards the internal wall 5 is also provided in this area. A cylindrical recess 28 extending coaxially to the axis 6 is formed in the valve body 25, in which recess 28 a valve-actuation pin 29 is arranged to be axially displaceable. This valve-actuation pin 29 is substantially cylindrical in shape and its central area has a tapered section 30. In the position of rest of the actuation pin 29 shown in FIG. 1, in which the valve 24 is closed, this tapered section 30 is situated between two seals 31, 32, which bear against the cylindrical part of the acutation pin 29 on either side of this section 30. Between these seals 31, 32 a connecting channel 33 extending approximately radially relative to the axis 6 opens into the area of the tapered section 30, which is in turn connected to the channels 7 in the vicinity of the internal wall 5 of the outer tube 2.

The seal 27 and the seal 31 are held axially outwards by means of a cover section 34 bearing on them and equally passed through by the actuation pin 29. A conical filler 35 tapering outwards in the form of a truncated cone bears in turn against the cover section 34, to which filler 35 is integrally formed the associated wall section of the outer tube 2, so that the outer tube 2 here forms a conical mounting section 36, by means of which the gas spring can be secured to a chair, table or the like simply by being forced into a correspondingly adjusted conical receiving section. The outer tube 2 is axially fixed in position on the filler 35 by a flanging 2a. An actuating slide 37 is arranged to be axially displaceable in the filler 35 and bears against the associated outer end of the actuation pin 29, so that the latter can be triggered by the outer end of the slide 37 formed as a kind of a control button 38. The seal 32 facing the partial housing chamber 23 is held by a sleeve-shaped cover 39 mounted onto a centring collar 40 of the valve body 25. The cover 39 has an inner annular web 41 holding the seal 32 and also being in alignment with the recess 28 and receiving and piloting a part of the actuation pin 29. The cover 39 further has an external annular web 42, which surrounds the centring collar 40, and which tightly bears against the internal wall 11 of the inner tube 3. This external annular web 42 is connected with the valve body 25 by a locking 43, whereby the whole cover 39 is firmly connected with the valve body 25. Since the valve body 25 and in particular the sleeve-shaped cover 39 consist of a plasticly formable plastics material, the shown locking 43 can be realized by the cover 39 being formed hot-plasticly. A seal 44 is arranged in the outer annular web 42 and seals off against the internal wall of the inner tube 3. In this area the inner tube 3 consisting of thermoplastic material is provided with a crimp 45 directed inwards and producing on the one hand the necessary pressing force against the seal 44 and moreover connecting the inner tube 3 axially firmly with the valve body.

At its end located in the partial housing chamber 23 the valve actuation pin 29 has a bearing disk 46, by means of which it is safe from being pushed out of the housing 1. The whole inner chamber 20 of the housing 1 is filled with compressed gas and as the case may be with a small quantity of a lubricant for lubricating purposes. The mode of operation of the longitudinally adjustable gas spring is as usual. When the valve 24 is closed, as is the case with the shown position of the actuation pin 29, then the piston 9 and thus the piston rod 12 are in an adjusted position of rest bearing against the compressed gas in the partial housing chambers 23, 23'. If the actuation pin 29 is displaced in a direction towards the partial housing chamber 23 by the slide 37 being actuated correspondingly, then the tapered section 30 of the actuation pin 29 bridges the seal 32, so that compressed gas can flow from the partial housing chamber 23, through the recess 28, via the connecting channel 33, the channels 7 and the relief channel or channels 22 into the other partial housing chamber 23'. This is the case, when the piston rod 12 is pushed into the housing with sufficient force while the valve 24 is open. If, however, no force or only a minor force is exercised on the piston rod 12 while the valve 24 is open, then the piston rod 12 with the piston 9 is pushed out of the housing 1 with the consequence that the gas flows in opposite direction. When the valve 24 is closed by the actuating pin 29 being released in a new longitudinally adjusted position of the piston rod 12 with the piston 9 relative to the housing 1, then a new longitudinal adjustment of the gas spring is realized.

The inner tube 3 consists of plastics material, preferably of a polyamide or an acetal resin. These plastics materials are distinguished by particularly smooth surfaces of very little peak-to-valley height which is considerably less than with seamless drawn steel tubes. While the peak-to-valley height of a seamless drawn steel tube is between 0.5 and 2 $\mu$m, it is clearly below 0.5 $\mu$m with an extruded or injection-moulded tube of plastics material. Moreover, compared with a steel tube, the tube of plastics material is easier and cheaper to manufacture.

As shows the above description, the outer tube 2 holds together the complete housing 1 of the gas spring.

What is claimed is:

1. A longitudinally adjustable gas spring comprising:
   an outer tube (2) and an inner tube (3) enclosing each other concentrically relative to a common axis (6) and thereby defining a free space between said outer tube (2) and said inner tube (3) and having a first end and a second end, and said outer tube (3) having an internal wall (5) and said inner tube (3) having an external wall (4) and an internal wall (11) and a wall thickness (b);
   a piston (9) slidably arranged in the inner tube (3) and bearing against its internal wall (11) with a seal (10) and defining a first partial chamber (23') in said inner tube (3) and a second partial chamber (23), said first and said second partial chambers (23', 23) and said free space being at least partially filled with a compressed gas;
   guiding and sealing means closing said outer tube (2) and said inner tube (3) at said first end of said tubes (2, 3);
   a piston rod (12) attached to said piston (9) and extending through said first partial chamber (23') and guided in said guiding means out of said tubes (2, 3) in a sealed manner;
   a valve (24) closing said tubes (2, 3) outwards at said second end of said tubes (2, 3) to connect said free space with said second partial chamber (23) neighbouring the valve (24), the valve (24) having a valve body (25) against which the inner tube (3) bears axially and radially; and
   at least one relief channel (22) steadily connecting said free space and said first partial chamber (23') adjacent to said guiding means,
   wherein the inner tube (3) consists of a plastics material, in the external wall (4) of which several groove-like channels (7) are provided forming the free space, which channels are covered by the internal wall (5) of the outer tube (2), have a depth (a) and a width (c) and a length which extends the entire length of said inner tube (10), and the inner tube (3) radially bears against the internal wall (5) of the outer tube (2) by way of webs (8) located between adjacent channels (7).

2. A gas spring according to claim 1, wherein 0.05 da$<$b$<$0.1 da applies to the wall thickness (b) of the inner tube (3) in relation to its outside diameter (da).

3. A gas spring according to claim 1, wherein 0.15 b$<$a$<$0.25 b applies to the depth (a) of the channels (7) in relation to the wall thickness (b) of the inner tube (3).

4. A gas spring according to claim 1, wherein 0.5 b$<$c$<$0.8 b applies to the width (c) of the channels (7) in relation to the wall thickness (b) of the inner tube (3).

5. A gas spring according to claim 1, wherein 0.8 c$<$e is valid for the distance (e) of adjacent channels (7) in relation to the width (c) of the channels (7).

6. In a longitudinally adjustable gas spring comprising an inner tube and an outer tube concentric therewith and enclosing said inner tube and thereby defining a free space therebetween, said inner tube and said outer tube each having an internal wall and an external wall; a piston slidably axially movable in said inner tube and bearing against the internal wall of said inner tube in a gas-tight manner and defining a first partial chamber within said inner tube on one side of said piston and a second partial chamber on another side of said piston, said first and second partial chambers and said free space containing a compressed gas; said outer tube having a first closed end; a piston rod extending from said piston through said first partial chamber and through said first closed end in a sealed manner; said outer tube and said inner tube having a second closed end; valve means adjacent said second closed end for connecting said free space with said second partial chamber; and at least one relief channel connecting said free space and said first partial chamber adjacent said first end, the improvement wherein
   said inner tube consists of a plastic material having a uniform interior diameter, its internal wall being smooth and its external wall having many groove-like channels spaced thereabout defining said free space, the external wall of said inner tube between adjacent groove-like channels lying against and being supported by the internal wall of said outer tube, said groove-like channels extending from said at least one relief channel near said first end to said valve means adjacent said second end, the distance between adjacent groove-like channels being greater than 80% of the width of said groove-like channels.

7. A gas spring according to claim 6 wherein said inner tube consists of a polyamide or an acetal resin and its inner wall has a peak-to-valley height less than 0.5 $\mu$m.

8. A gas spring according to claim 6 wherein said inner tube is extruded.

9. A gas spring according to claim 6 wherein the depth of said groove-like channels is between 15% and 25% of the wall-thickness of said inner tube.

* * * * *